United States Patent [19]
Sienicki

[11] Patent Number: 5,823,170
[45] Date of Patent: Oct. 20, 1998

[54] METHOD AND APPARATUS FOR REDUCING ENGINE NOX EMISSIONS

[75] Inventor: Edward J. Sienicki, Hickory Hills, Ill.

[73] Assignee: Navistar International Transportation Corp., Chicago, Ill.

[21] Appl. No.: 916,861

[22] Filed: Aug. 22, 1997

[51] Int. Cl.$^6$ ................................................ G05D 23/00
[52] U.S. Cl. ........................................................ 123/551
[58] Field of Search ...................................... 123/551, 557

[56] References Cited

U.S. PATENT DOCUMENTS

| | | | |
|---|---|---|---|
| 3,760,783 | 9/1973 | Frankle ................................... | 123/551 |
| 3,996,912 | 12/1976 | Dreisin et al. ........................... | 123/551 |
| 4,131,086 | 12/1978 | Nogucki et al. ......................... | 123/551 |
| 4,625,910 | 12/1986 | Kawamura ............................... | 123/551 |

OTHER PUBLICATIONS

"Installation Instructions for Cold Starting and Warmup Kit . . ." Navistar International Transportation Corp., Form No. 1171699R1, 1996. pp. 2–10.

"Cold Start System Application, Navistar I–6 PLN Diesel Engine" Beru Corporation, Feb. 1996 pp. 1–9.

*Primary Examiner*—Marguerite McMahon
*Attorney, Agent, or Firm*—Dennis K. Sullivan

[57] ABSTRACT

An apparatus and method for reducing NOx emissions in diesel engine exhaust air includes a secondary burner engaged within an air intake system of the engine, upstream of an intercooler in the intake system, the secondary burner being actuated during warm temperature operation of the engine to fumigate the intake air with $CO_2$ thus decreasing NOx output in the exhaust gases. A primary burner disposed between the intercooler and the intake manifold may be selectively operated during cold startup operation of the engine. The apparatus may further include an oxidation catalyst in an exhaust gas line from the engine to eliminate hydrocarbons from the engine exhaust emissions. In an alternative embodiment, the primary burner is eliminated and the intake air from the secondary burner is selectively bypassed around the intercooler to provide cold startup operation.

11 Claims, 2 Drawing Sheets

METHOD AND APPARATUS FOR REDUCING ENGINE NOX EMISSIONS

FIELD OF THE INVENTION

The present invention relates to a method and apparatus for reducing oxides of nitrogen (NOx) emissions from diesel engines. More particularly, the method and apparatus disclose placement of an engine intake air burner upstream of an air-to-air heat exchanger or intercooler of an engine, the burner creating carbon dioxide ($CO_2$) for fumigation of the engine intake air before it enters the combustion chamber of the engine. The engine air burner is ignited during normal warm engine operation and the combustion gases therefrom are supplied to the engine after being cooled in the heat exchanger. The addition of a burner for $CO_2$ fumigation may however increase the concentration of hydrocarbons in the exhaust gas, and an oxidation catalyst is provided in the exhaust system of the engine to eliminate the hydrocarbons from the exhaust gas.

THE PRIOR ART

Engine air burners have been used to improve diesel engine cold start-up characteristics. For such an application, the burner is typically located in the engine intake manifold, downstream of an air-to-air heat exchanger or intercooler of the engine and is used only during cold start up at temperatures below 32° F., to provide warmed engine intake gases to assist in starting the diesel engine, the burner sitting unused during periods of warm engine operation. No provision has been made for using such a burner in a method for reducing NOx in exhaust gas emissions.

It is previously known to fumigate the engine intake air with $CO_2$ through the use of exhaust gas recirculation (EGR). However, the exhaust gas contains a substantially higher level of NOx than does the exhaust from the burner of the invention.

SUMMARY OF THE INVENTION

It is a primary object of the invention to provide an effective method and apparatus for decreasing NOx in diesel engine exhaust gas emissions, without significantly increasing exhaust hydrocarbon concentrations or fuel consumption.

This object, as well as others, is met by the method and apparatus of the present invention wherein a secondary engine intake air burner is engaged within an intake air system of an engine downstream of an air filter thereof and upstream of a heat exchanger thereof. The secondary burner is ignited during periods of warm engine operation for fumigation of intake air with $CO_2$. Further, an oxidation catalyst is engaged in an exhaust system of the engine for removing hydrocarbons from exhaust gases passing therethrough. The NOx reduction effected by the method and apparatus herein disclosed is more effective than that obtainable by exhaust gas recirculation because burner exhaust gas contains a lower concentration of NOx per mole of $CO_2$ than does the recirculated engine exhaust gas. The engine may also be provided with a primary air burner downstream of the heat exchanger for assisting cold starting operation or a selectively controlled bypass may be provided to direct the flow from the secondary air burner around the heat exchanger to assist cold startup of the engine.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
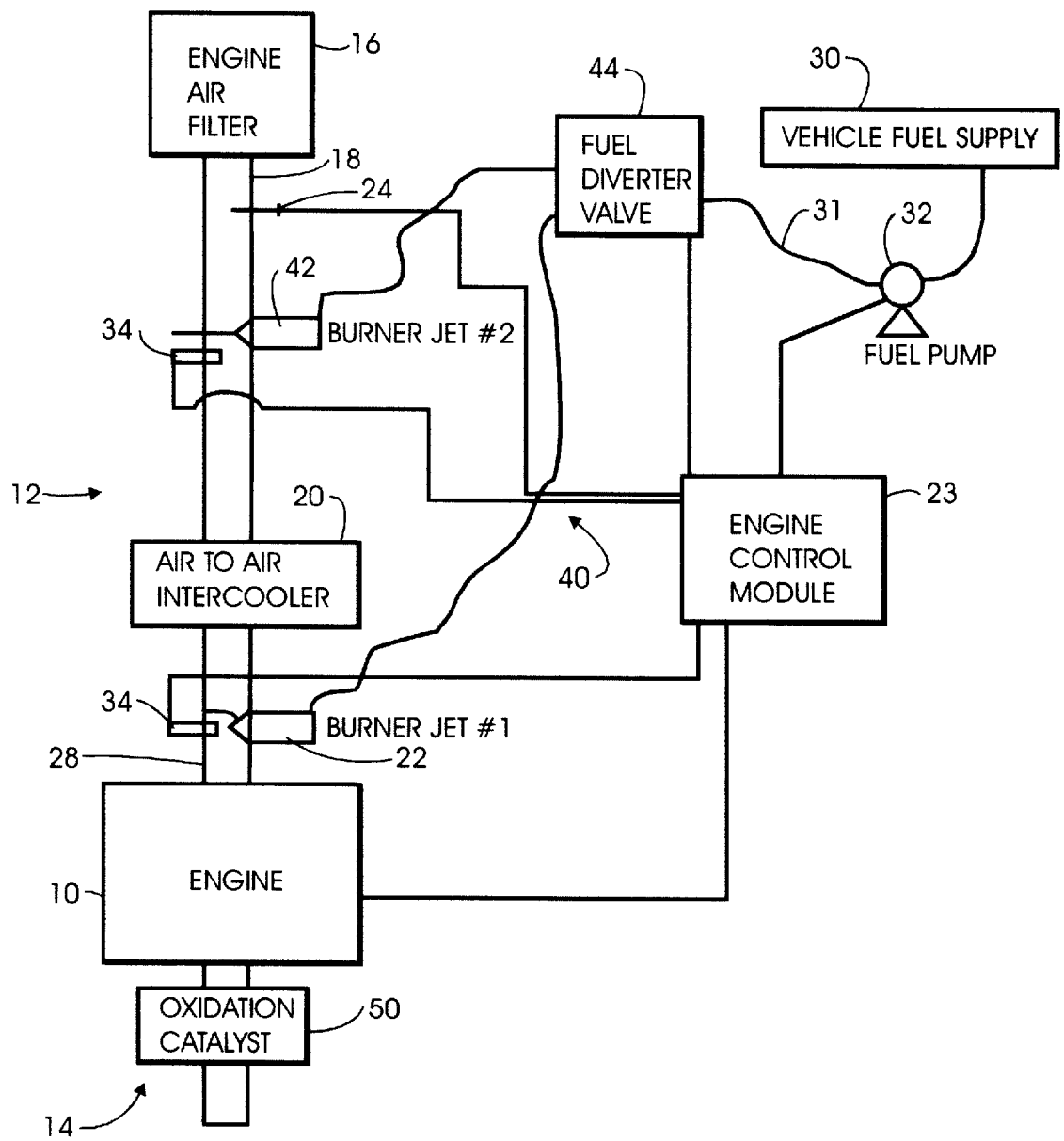
FIG. 1 is a schematic block diagram of the apparatus of the present invention used in carrying out the method of the invention.

Referring now to the drawings in greater detail, there is schematically illustrated in the Figure, a diesel engine 10 which includes an intake air system 12 and an exhaust system 14. The diesel engine 10 may further include an exhaust driven turbocharger (not shown) of conventional configuration disposed in the intake air system.

The intake air system 12 incorporates an air filter 16 at an upstream end 18 thereof and a heat exchanger 20 downstream of the filter 16, here taking the form of an air-to-air intercooler 20, for providing cooled air to the engine 10. A typical intake air system 12 for a diesel engine 10 may also include a cold starting assist means, such as a primary air heater or burner 22 which is positioned between the heat exchanger 20 and the engine 10 for use in aiding engine 10 startup when ambient temperatures drop below 32° F. The burner 22 is mounted within an intake manifold 28 of the engine 10 and is fed diesel fuel from a vehicle supply 30 via an auxiliary fuel line 31 into which fuel is pumped by a fuel pump 32, which also supplies fuel to the engine 10.

The burner 22 is ignited by a glow plug 34 which creates sufficient heat for igniting the burner 22. It will be understood that control of the startup process defined above is typically provided by an electronic engine control module 23 having an intake air temperature sensor 24 functionally engaged thereto. Once the engine 10 is running, the burner 22 is no longer required and the burner is shut off until needed again.

The NOx emissions control apparatus 40 of the present invention provides a secondary air burner 42, seated within the engine air intake system 12 of the engine 10, the secondary burner 42 being positioned upstream of the air-to-air intercooler 20 rather than downstream thereof. The secondary burner 42 may be identical to the primary cold-start burner 22 and is also operated by the engine control module 23. A fuel diverter valve 44 is provided in the auxiliary fuel line 31 for controlling the provision of fuel to either the primary cold start air burner 22 when needed, or to the secondary heater or burner 42, activated only during normal operation of the engine 10 after warm-up, providing for mutually exclusive operation of the burners 22 and 42.

The primary burner 22 is positioned downstream of the air-to-air intercooler 20 to provide warmed air to the engine 10, for easing cold starting thereof, in a known manner, while the secondary heater or burner 42 is positioned upstream of the air-to-air intercooler 20 to minimize the heat load created thereby during normal operation of the engine 10. Higher intake temperatures are known to cause an increase in NOx emissions. The calculated additional heat load on the intercooler for a 0.1% $CO_2$ increase is about 130 BTU per minute causing a temperature increase of about 36° F. during use of the secondary burner 42.

It will be further understood that the secondary burner 42 is ignited in a manner similar to the manner in which the primary heater 22 is presently ignited, i.e., by also being functionally engaged to a glow plug 34 for ignition.

As will be described in greater detail hereinafter, it has been found through empirical testing that a preferred embodiment of the apparatus 40 further incorporates an oxidation catalyst 50 within the exhaust system 14 of the engine 10.

Turning now to the method for using the NOx emissions reduction apparatus 40. Upon cold engine 10 start up, the primary burner 22 is activated and fuel is sent the fuel pump 32, via the fuel line 31, through the diverter valve 44. The primary burner 22 is ignited by the glow plug 34, such aid for cold coolant start up only being activated at temperatures at or below 32° F.

Once the engine 10 begins running and warms up, the primary burner 22 is deactivated and the engine 10 runs at what is referred to as warm temperature operation or normal operation. The primary heater 22 is not reactivated until a start up at a temperature below 32° F. is again required.

Once the engine 10 is running in the warm temperature operation mode, the fuel diverter valve 44 is actuated to shunt fuel to the secondary burner 42 for ignition by the glow plug 34.

It has been found through empirical testing that use of the secondary heater 42 to cause fumigation of $CO_2$ into engine intake air significantly reduces NOx emissions in the exhaust gas of engine 10. The reduction has been of greater magnitude than that obtained through exhaust gas recirculation because exhaust gas from the burner 42 has a much lower concentration of NOx per mole of $CO_2$ than does engine exhaust. One studied sample of engine exhaust gas provided 76 ppm NOx per % of $CO_2$ while burner 42 exhaust gas provided only 8.5 ppm NOx per % of $CO_2$.

Also, continuous use of the secondary burner 42 to provide an average $CO_2$ level of 0.1%, will only decrease fuel economy by 2.5% at according to calculations based upon testing, such fuel economy decrease being considered nominal when taking into account the degree of NOx reduction produced.

Use of the secondary burner 42, however, creates an increase in the amount of unburned hydrocarbons in the engine exhaust gases. To reduce most, if not all, hydrocarbons out of the exhaust gases, the NOx emissions reduction apparatus 40 preferably includes an oxidation catalyst 50 within the exhaust system 14 of the engine 10.

DESCRIPTION OF THE SECOND EMBODIMENT

Figure 2:
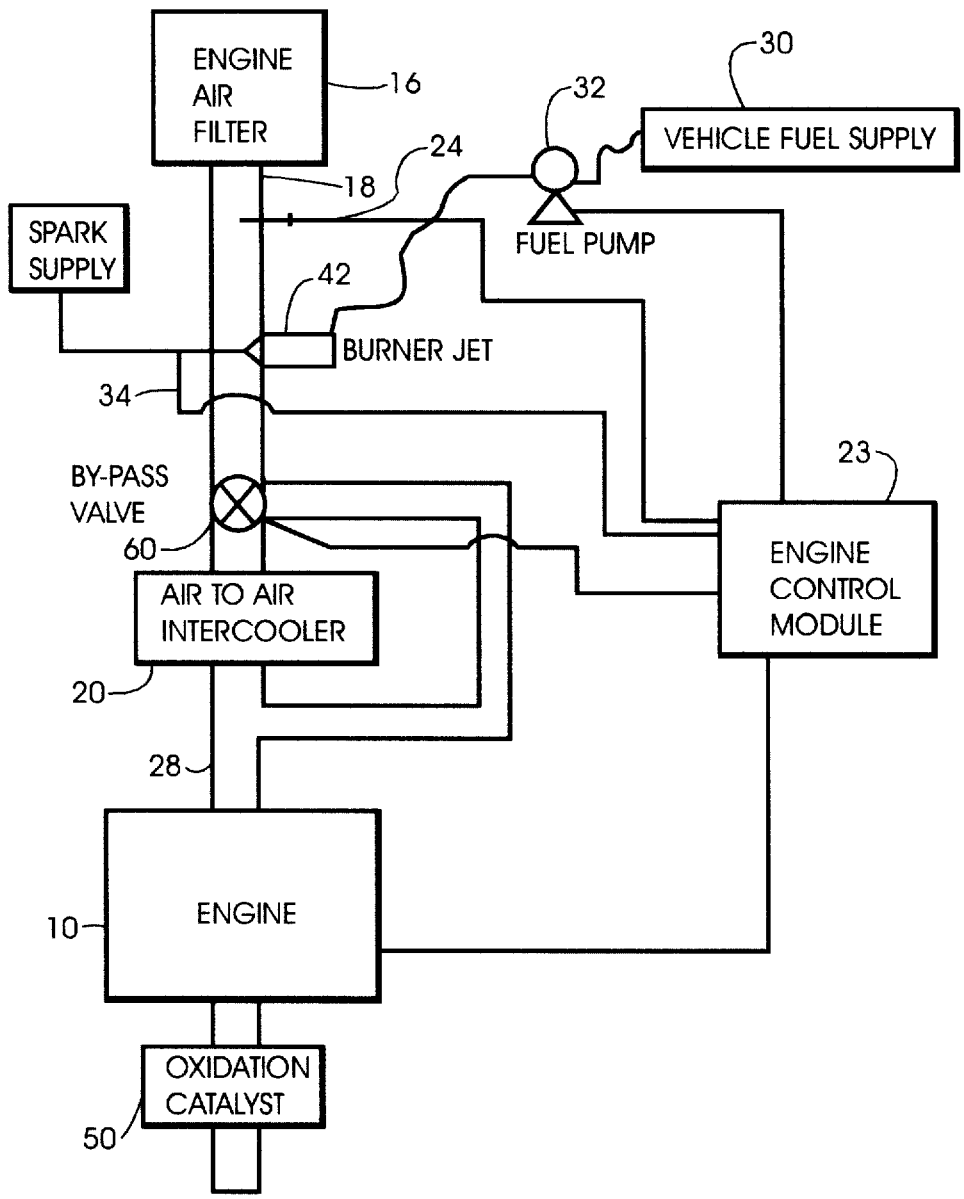
FIG. 2 is a schematic block diagram of a second embodiment of the present invention used in carrying out the method of the invention.

In FIG. 2 there is disclosed an alternative embodiment of the invention. Components that are the same as the first embodiment bear the same reference numerals. In this embodiment, rather than having two burners, a single burner 42 is disposed upstream of the intercooler 20 and a bypass valve 60 is disposed between the burner 42 and the intercooler 20 for engine starting operation. Thus, the bypass valve 60 has a first position closing the passage to the intercooler 20 and directing the flow from the burner 42 into a bypass passage 62 which extends from the burner to an intersection 64 with intake manifold 28. The bypass valve 60 has a second position closing the bypass passage 28 and directing the flow from the burner 42 to the intercooler 20. The burner 42 and the bypass valve 60 are controlled by the engine control module 23 so that, if the intake air temperature 24 or coolant temperature of the engine is less than 32° F., as during starting of the engine 10, the bypass valve 60 is disposed in the first position thereof directing the intake air after being warmed by the burner 42 around the intercooler 20 to the intake manifold 28. The engine control module 23 controls the fuel pump to deliver the proper flow for start-up operation.

When the engine coolant temperature is 32° F. or more, the engine control module directs the bypass valve to assume its second position so that intake air flow from the burner 42 will pass through the intercooler 20 to the intake manifold. In this mode, as in the first embodiment, the engine control module 23 controls the fuel flow to the burner 42 to maximize NOx emission control while minimizing fuel economy losses and hydrocarbon emissions.

As described above, the NOx emissions reduction apparatus and method of the present invention provide a number of advantages, some of which have been described above and others of which are inherent in the invention. Also, it will be appreciated by those of skill in the art that various alterations and modifications may be made to either of the NOx emissions reduction apparatuses described herein and their methods of operation without departing from the teachings herein. Accordingly the scope of the invention is only to be limited as necessitated by the accompanying claims.

What is claimed is:

1. In combination with a diesel engine an emissions control apparatus for use in decreasing NOx emissions in diesel engine exhaust gas by fumigating $CO_2$ into engine intake air, the diesel engine having at least an electronic controller, a temperature sensor functionally engaged thereto, an air intake system including an intercooler therein, an exhaust system, a fuel system including a fuel pump, and the emissions control apparatus comprising a burner engaged within the air intake system upstream of the intercooler, the burner being functionally supplied with fuel from said fuel system and being operated by the electronic controller to ignite during periods of sensed warm running of the engine to fumigate $CO_2$ into the engine intake air.

2. The apparatus of claim 1 further including an oxidation catalyst in the engine exhaust system.

3. The apparatus of claim 1 wherein said engine fuel system includes a fuel line having a valve therein which is operated by the electronic controller to selectively feed fuel to the burner only during periods of sensed warm engine operation.

4. The apparatus of claim 3 wherein said valve is further engaged to a primary burner downstream of said intercooler, the primary burner supplying warm gases to the engine during cold startup conditions, and the valve providing for selective and mutually exclusive operation of each heater.

5. The apparatus of claim 1 wherein a bypass valve is disposed in said intake air system between said burner and said intercooler and a bypass conduit fluidly connected between said bypass valve and said intake air system downstream of said intercooler, said bypass valve having a first position directing intake air to said bypass conduit and a second position directing intake air to said intercooler, said bypass valve and said burner being selectively controlled to dispose said bypass valve in said first position and provide warm gases for starting said engine only when a temperature indicative of engine coolant temperature is below a predetermined temperature, said bypass valve and said burner being selectively controlled to dispose said bypass valve in said second position and provide $CO_2$ fumigation only when said temperature indicative of engine coolant temperature is at or above said predetermined temperature.

6. A method for use in decreasing NOx emissions in diesel engine exhaust gas by fumigating engine intake air with $CO_2$, the engine having an air intake system including an intercooler and an exhaust system, the method including the step of: combusting fuel with a portion of the engine intake air upstream of the intercooler during periods of warm engine operation to fumigate the air intake with $CO_2$.

7. The method of claim 6 further including the step of disposing an oxidation catalyst within the engine exhaust system for removal of hydrocarbons from engine exhaust.

8. The method of claim 6 further including the steps of: providing an auxiliary fuel line from a fuel system; providing a valve controller in the auxiliary fuel line; functionally connecting the auxiliary fuel line to an air burner; and controlling feeding of fuel to the burner by operation of the valve controller.

9. The method of claim 8 further including the steps of: connecting a further cold start air burner to the valve controller; disposing said cold start air burner in said intake system downstream of said intercooler; and operating said valve controller to selectively provide fuel to one of the two burners engaged thereto in a mutually exclusive manner to burn said fuel.

10. The method of claim 9 and said cold start air burner being provided fuel by said controller only during engine start up.

11. The method of claim 6 further including the steps of selectively bypassing said intake air around said intercooler from a location between said burner and said intercooler to a location in said intake system downstream of said intercooler only during cold engine startup and operating said burner for cold startup operation.

* * * * *